(12) United States Patent
Fujita et al.

(10) Patent No.: US 8,406,261 B2
(45) Date of Patent: Mar. 26, 2013

(54) LASER DRIVING DEVICE AND LASER DRIVING METHOD

(75) Inventors: Goro Fujita, Kanagawa (JP); Tsutomu Maruyama, Kanagawa (JP); Seiji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 12/791,992

(22) Filed: Jun. 2, 2010

(65) Prior Publication Data

US 2010/0309938 A1 Dec. 9, 2010

(30) Foreign Application Priority Data

Jun. 9, 2009 (JP) ................................. 2009-138491

(51) Int. Cl.
*H01S 3/00* (2006.01)
*H01S 3/13* (2006.01)
*H01S 3/10* (2006.01)

(52) U.S. Cl. ................. 372/38.02; 372/38.1; 372/38.07; 372/25; 372/30

(58) Field of Classification Search ............. 372/29.015, 372/29.02, 30, 38.1, 38.02, 38.07
See application file for complete search history.

(56) References Cited

U.S. PATENT DOCUMENTS

| | | | |
|---|---|---|---|
| 7,760,779 B2 * | 7/2010 | Mizuno ...................... | 372/38.02 |
| 2004/0013068 A1 * | 1/2004 | Kato et al. ................. | 369/53.36 |
| 2004/0233948 A1 * | 11/2004 | Quinn et al. ............... | 372/38.02 |

FOREIGN PATENT DOCUMENTS

JP 2005-340774 A 12/2005

* cited by examiner

*Primary Examiner* — Jessica Stultz
*Assistant Examiner* — Phillip Nguyen
(74) *Attorney, Agent, or Firm* — Wolf, Greenfield & Sacks, P.C.

(57) ABSTRACT

A laser driving device includes: a pulse signal generating unit that, after a voltage has risen from a predetermined reference voltage to a predetermined output voltage and a time of a sum of an oscillation period of relaxation oscillation and a light emission start time in a predetermined laser diode has nearly elapsed, generates a pulse signal having a waveform that falls divisionally in two or more stages from the output voltage to the reference voltage; and an output unit that generates a laser drive signal by performing signal processing on the pulse signal and outputs the signal to the laser diode.

4 Claims, 10 Drawing Sheets

CONFIGURATIONS OF OPTICAL DISC DEVICE AND OPTICAL PICKUP

CONFIGURATION OF LASER DRIVING UNIT

PULSE SIGNAL, LASER DRIVE SIGNAL, AND LIGHT BEAM

CONFIGURATION OF PULSE SIGNAL GENERATOR

SIGNAL WITHIN PULSE SIGNAL GENERATOR

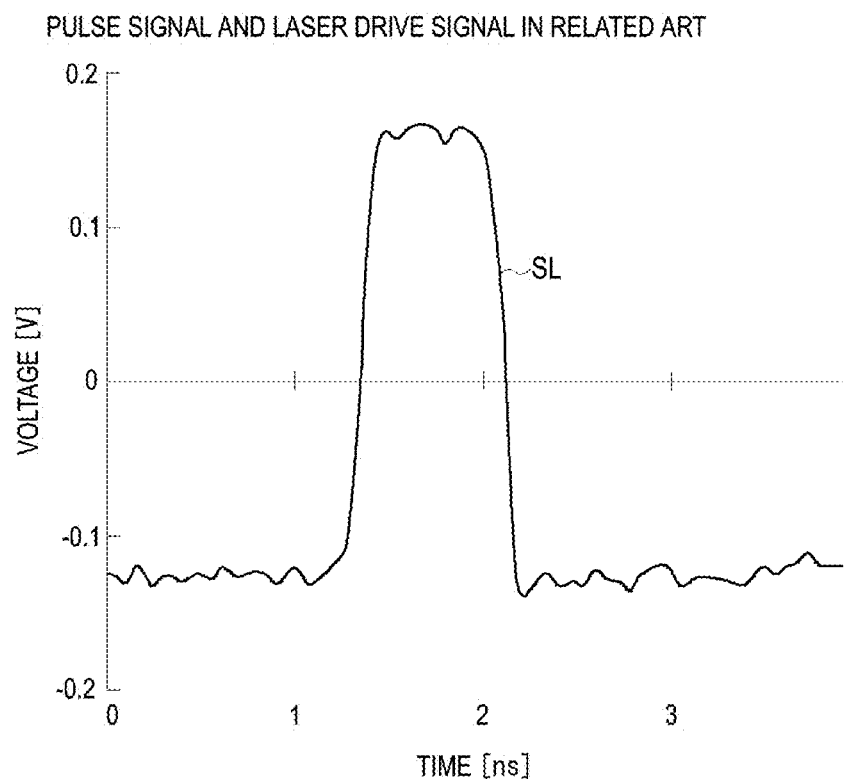
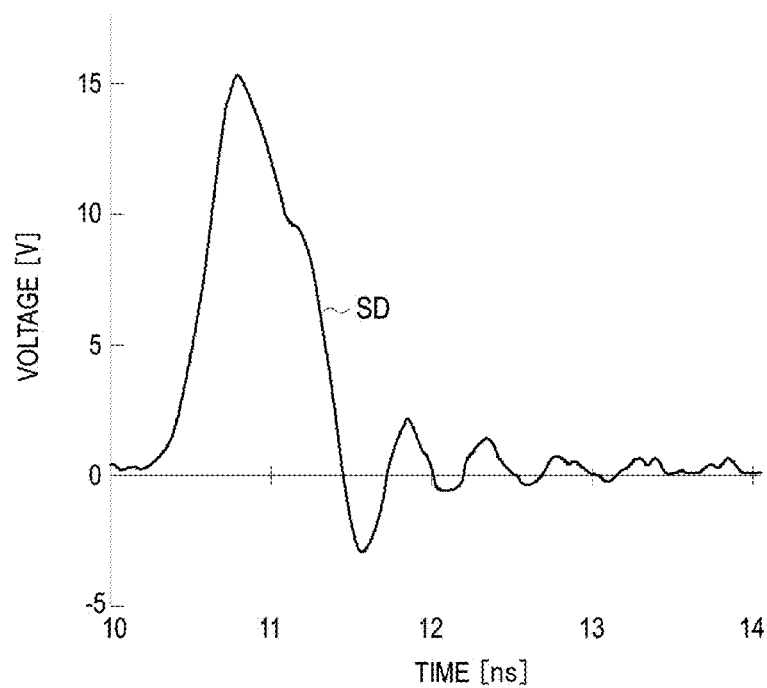

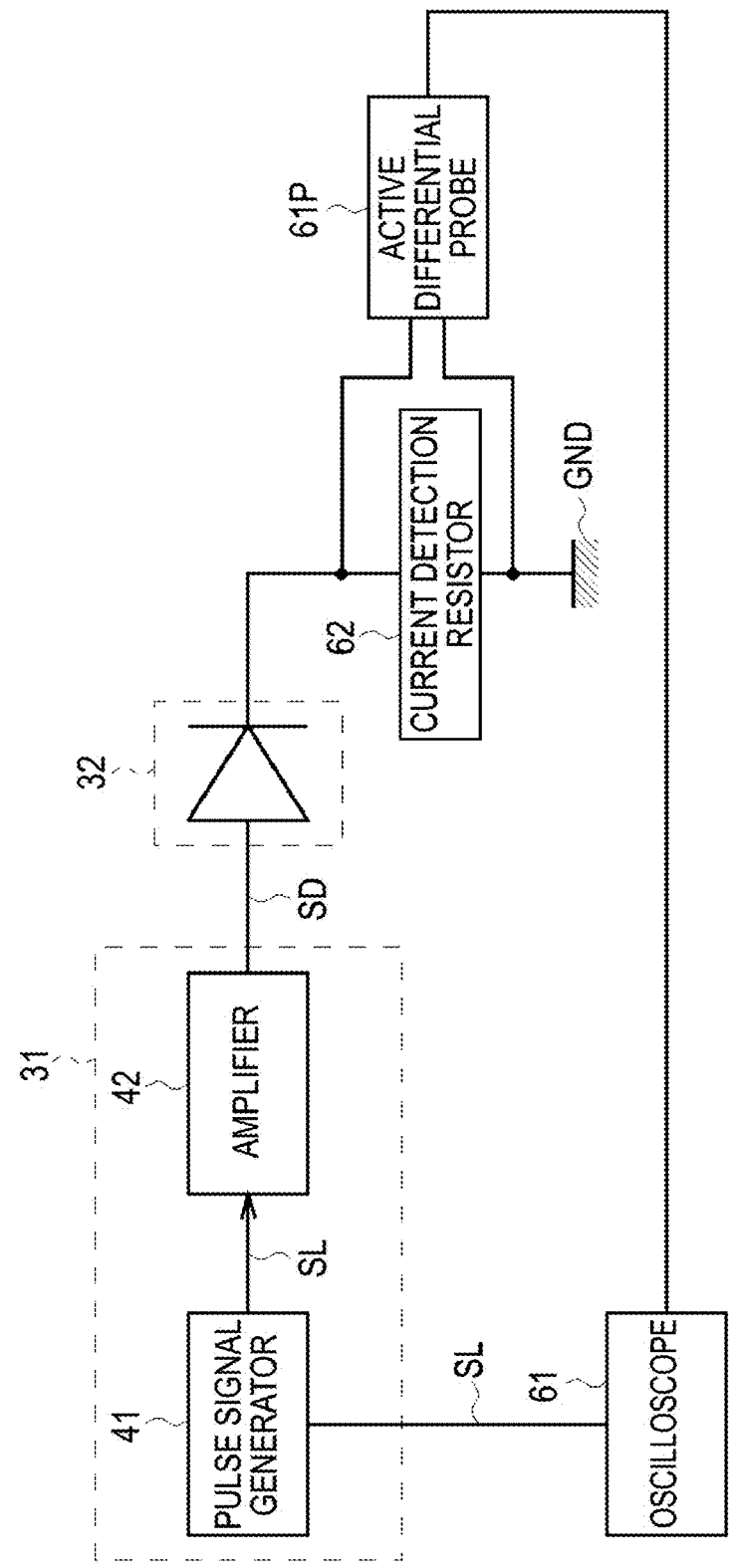

VOLTAGE OF ADDITIONAL RECTANGULAR WAVE IN PULSE SIGNAL

LASER DRIVE CURRENTS DEPENDING ON VOLTAGES OF
ADDITIONAL RECTANGULAR WAVE

PULSE SIGNALS DEPENDING ON VOLTAGES OF ADDITIONAL RECTANGULAR WAVE

PULSE SIGNAL (1) ACCORDING TO ANOTHER EMBODIMENT

PULSE SIGNAL (2) ACCORDING TO ANOTHER EMBODIMENT is a schematic diagram showing configurations of an

LASER DRIVING DEVICE AND LASER DRIVING METHOD

BACKGROUND OF THE INVENTION

1. Field of the Invention

The present invention relates to a laser driving device and a laser driving method, and is suitable for application to an optical disc device that records information in an optical disc using a light beam, for example.

2. Background Art

In related art, optical disc devices adapted to apply a light beam to an optical disc such as a CD (compact disc), a DVD (Digital Versatile Disc), and a Blu-ray Disc (registered trademark, called BD as below) and record information have been widely spread.

Some of the optical disc devices are adapted to generate pulse signals using a predetermined pulse signal generator, amplify the signals by signal processing using an amplifier, and output them as laser drive signals to a laser diode, and thereby, output pulsed light beams from the laser diode.

In this regard, when the falling time of the pulse signal supplied from the pulse signal generator to the amplifier becomes earlier, an undershoot may occur in the laser drive signal due to the amplification characteristic of the amplifier and the inductance component and the capacitance component within the laser diode.

Accordingly, the laser diode may be broken or deteriorated in characteristics due to application of a reverse voltage.

In order to reduce the undershoot of the laser drive signal, a laser drive circuit that connects a damping circuit including a series circuit of a resistor and a capacitor to the laser diode in parallel has been proposed (e.g., see JP-A-2005-340774 (FIG. 1)).

SUMMARY OF THE INVENTION

However, if such a damping circuit is added, the number of parts increases in the optical disc device. Further, there has been a problem that an effort to set the constant of the damping circuit is necessary.

There is a need for a laser driving device and a laser driving method that can prevent deterioration and breakage of a laser diode by a simple configuration.

In a laser driving device according to an embodiment of the invention, a pulse signal generating unit that, after a voltage has risen from a predetermined reference voltage to a predetermined output voltage and a time of a sum of an oscillation period of relaxation oscillation and a light emission start time in a predetermined laser diode has nearly elapsed, generates a pulse signal having a waveform that falls divisionally in two or more stages from the output voltage to the reference voltage, and an output unit that generates a laser drive signal by performing signal processing on the pulse signal and outputs the signal to the laser diode are provided.

In the laser driving unit, by making the falling voltage of the laser drive signal smaller in stages, the laser drive signal with the reduced undershoot that may occur when signal processing is performed in the output unit can be supplied to the laser diode.

According to the embodiment of the invention, by making the falling voltage of the laser drive signal smaller in stages, the laser drive signal with the reduced undershoot that may occur when signal processing is performed in the output unit can be supplied to the laser diode. Thus, the embodiment of the invention can realize a laser driving device and a laser driving method that can prevent deterioration and breakage of a laser diode by a simple configuration.

BRIEF DESCRIPTION OF THE DRAWINGS

FIGS. 6A and 6B are schematic diagrams showing a pulse signal and a laser drive signal in related art.

FIG. 8 is a schematic diagram showing a configuration of an experiment system of a laser drive current depending on a voltage of additional rectangular wave.

DESCRIPTION OF PREFERRED INVENTION

As below, embodiments for implementing the invention (hereinafter, referred to as embodiments) will be explained. The explanation will be made in the following order.

1. Embodiment
2. Other Embodiments

1. Embodiment

1-1. Configurations of Optical Disc Device and Optical Pickup

Figure 1:
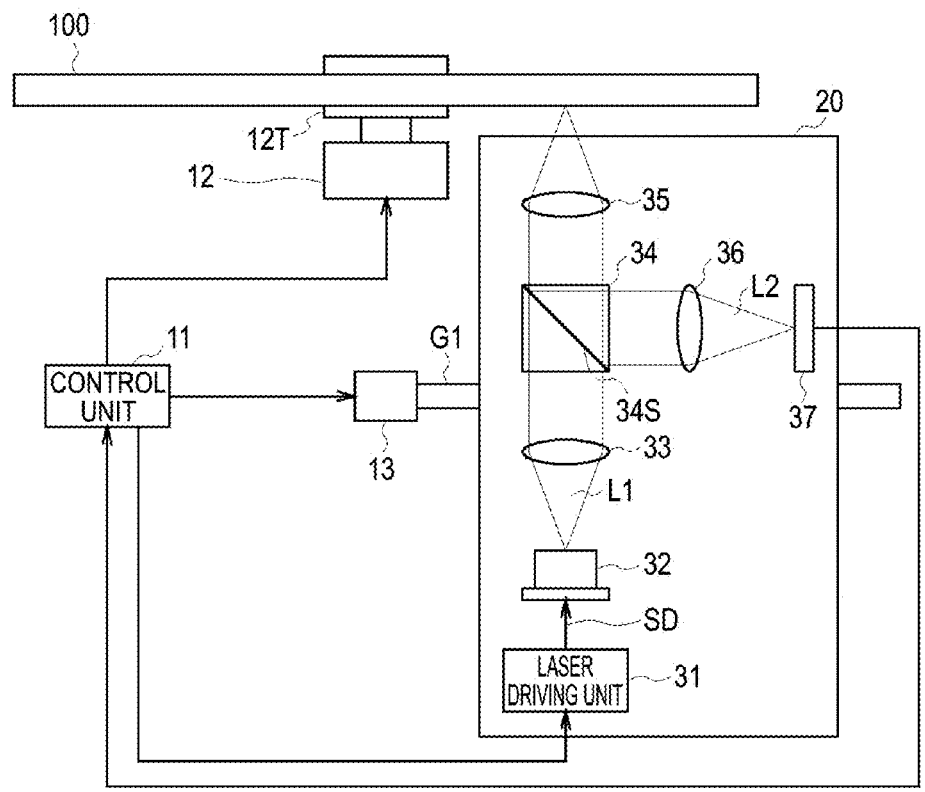
FIG. 1 is a schematic diagram showing configurations of an optical disc device and an optical pickup.

An optical disc device 1 shown in FIG. 1 is adapted to output a light beam in short pulses having high light intensity that can cause two-photon absorption reaction from a laser diode 32 to an optical disc 100 having a recording layer containing a two-photon absorbent material that two-photon-absorbs light having a predetermined wavelength (see JP-A-2008-259112).

In the optical disc device 1 using the two-photon absorption reaction, a pulsed laser drive signal having a voltage higher (e.g., 1.5 times or higher) than a voltage of a laser drive signal typically applied to a laser diode may be applied to a laser diode.

Accordingly, the optical disc device 1 can make the maximum value of instantaneous light intensity of a light beam higher than a light beam output from a typical laser diode.

The laser diode 32 starts light emission after a lapse of a certain time after application of the laser drive signal is started. Hereinafter, the time is referred to as "light emission start time τd".

Further, when a pulsed laser drive signal SD having a high voltage is applied to the laser diode 32, photon density (i.e., light intensity) of the light beam oscillates due to so-called relaxation oscillation. Hereinafter, a period of the amplitude of the oscillating photon density is referred to as "oscillation period ta". Here, regarding the value of light intensity, the amplitude of the first wave appearing immediately after the start of light emission is the maximum, gradually attenuates in the second wave and the third wave, and eventually becomes stable.

Further, the optical disc device 1 is adapted to integrally control the entire device using a control unit 11 and perform recording and reproduction of information for the optical disc 100.

The control unit 11 includes a CPU (Central Processing Unit), a ROM (Read Only Memory) in which various programs etc. are stored, and a RAM (Random Access Memory) used as a work memory of the CPU (not shown).

That is, the control unit 11 rotatably drives a spindle motor 12 to turn the optical disc 100 mounted on a turn table 12T at a desired speed. Further, the control unit 11 drives a sled motor 13 to greatly move an optical pickup 20 along a movement axis G1 in a tracking direction as a direction toward the inner circumference side or the outer circumference side of the optical disc 100.

When information is recorded in the optical disc 100, for example, the control unit 11 generates recording signals by performing predetermined coding processing, modulation processing, or the like on the information and supplies it to a laser driving unit 31 of the optical pickup 20.

The laser driving unit 31 supplies a laser drive signal SD generated based on the recording signal supplied from the control unit 11 to the laser diode 32.

The laser diode 32 outputs a light beam L1 based on the laser drive signal SD and allows the beam to enter a collimator lens 33.

The collimator lens 33 converts the light beam L1 from the diverging light into parallel light and allows the beam to enter a beam splitter 34.

The beam splitter 34 has a reflection-transmission surface 34S that reflects or transmits the light beam L1 at a predetermined rate. When the light beam L1 enters, the reflection-transmission surface 34S transmits the light beam L1 and allows the beam to enter an objective lens 35.

The objective lens 35 is adapted to collect the light beam L1, and thereby, focus the beam on a target position within the optical disc 100 to form a recording mark.

On the other hand, when information is reproduced from the optical disc 100, the control unit 11 supplies a reproduction light amount signal to the laser driving unit 31 of the optical pickup 20.

The laser driving unit 31 supplies a laser drive signal SD generated based on the reproduction light amount signal supplied from the control unit 11 to the laser diode 32.

The laser diode 32 outputs a light beam L1 based on the laser drive signal SD and allows the beam to focus on the target position within the optical disc 100 via the collimator lens 33, the beam splitter 34, and the objective lens 35.

The objective lens 35 converts a reflected light beam L2 reflected from the optical disc 100 into parallel light and allows the beam to enter the beam splitter 34. In this regard, the beam splitter 34 reflects part of the reflected light beam L2 using the reflection-transmission surface 34S and allows the beam to enter a collective lens 36. The collective lens 36 collects and applies the reflected light beam L2 to a light receiving element 37.

The light receiving element 37 has detection areas provided on the surface thereof, and generates a detection signal based on detection results of the reflected light beam L2 in the respective detection areas and sends it to the control unit 11.

The control unit 11 is adapted to reproduce the information recorded in the optical disc 100 by generating a reproduction RF signal based on the detection signal and performing predetermined demodulation processing, decoding processing, or the like thereon.

As described above, the optical disc device 1 is adapted to execute information recording processing and information reproduction processing for the optical disc 100.

1-2. Configuration of Laser Driving Unit

Figure 2:
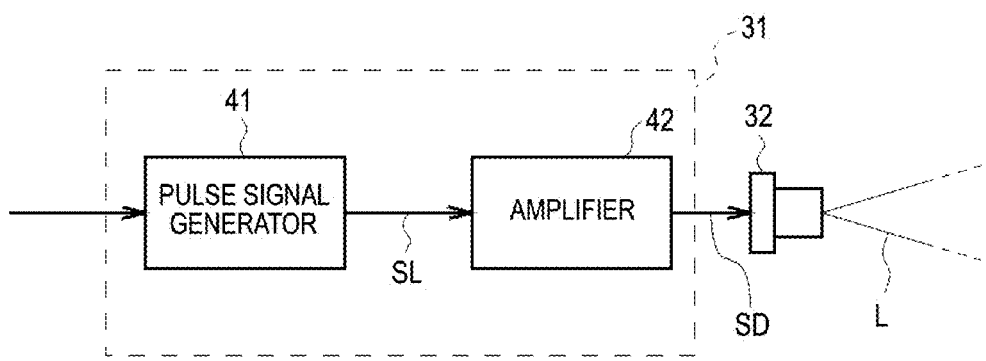
FIG. 2 is a schematic diagram showing a configuration of a laser driving unit.

The laser driving unit 31 shown in FIG. 2 includes a pulse signal generator 41 that generates plural kinds of pulsed signals at predetermined times, and an amplifier 42 that drives the laser diode 32.

When a recording signal is sent out from the control unit 11 (FIG. 1), the laser driving unit 31 supplies the recording signal to a pulse signal generator 41.

Figure 3A:
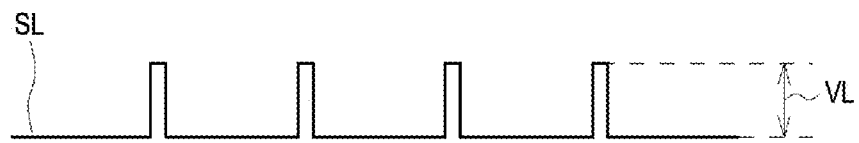
FIGS. 3A to 3C are schematic diagrams showing a pulse signal, a laser drive signal, and a light beam.

The pulse signal generator 41 generates a pulse signal SL that changes in a pulsed manner based on the supplied recording signal as shown in FIG. 3A, and supplies it to the amplifier 42. The pulse signal SL shows times to supply power to the laser diode 32 and a magnitude of the voltage level for the amplifier 42.

Further, the pulse signal generator can generate plural rectangular waves having various durations and voltages within, and output combinations of the plural rectangular waves.

Figure 3B:
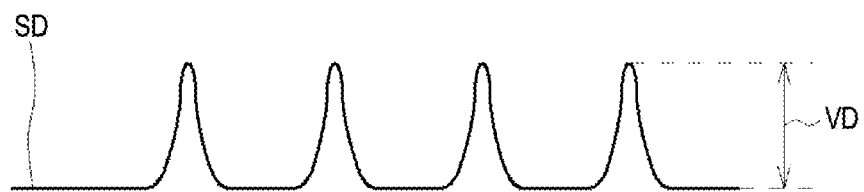

The amplifier 42 generates a laser drive signal SD as shown in FIG. 3B by amplifying the pulse signal SL at a predetermined amplification factor and supplies it to the laser diode 32. Accordingly, the peak voltage VD of the laser drive signal SD changes in response to the peak voltage VL of the pulse signal SL. Further, the laser drive signal SD has a waveform distorted due to the amplification characteristic of the amplifier 42.

Figure 3C:
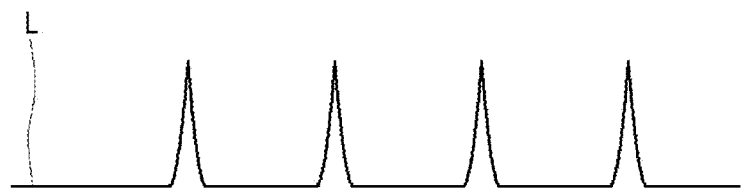

When receiving the supply of the laser drive signal SD, the laser diode 32 outputs a light beam L while changing light intensity in a pulsed manner as shown in FIG. 3C.

Further, the laser diode 32 is a general laser diode using semiconductor light emission (e.g., SLD253VL manufactured by Sony). The absolute maximum rating of the reverse voltage of the laser diode 32 is 2 [V].

Here, the laser driving unit 31 outputs rectangular wave as the pulse signal SL at high level in a time obtained by adding the oscillation period to of relaxation oscillation to the above described light emission start time $\tau d$.

Accordingly, the laser diode 32 to which the laser drive signal SD of the amplified pulse signal SL has been supplied can output a pulsed light beam L corresponding only to the part of the first wave in the above described relaxation oscillation.

1-3. Configuration of Pulse Signal Generator

Figure 4:
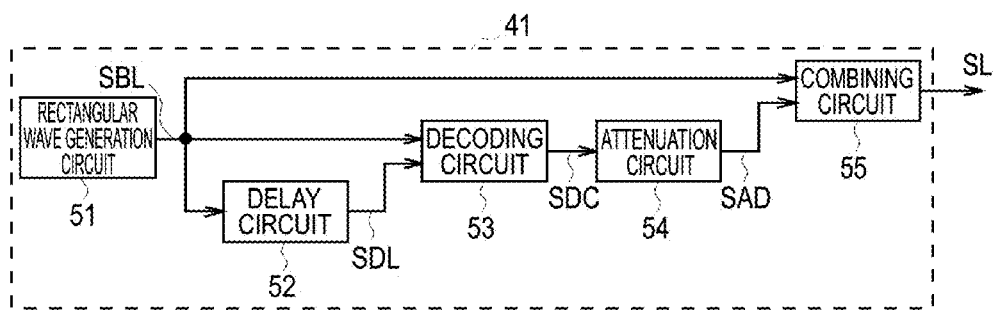
FIG. 4 is a schematic diagram showing a configuration of a pulse signal generator.

Next, a configuration of the pulse signal generator 41 will be explained. As shown in FIG. 4, the pulse signal generator 41 includes a rectangular wave generation circuit 51, a delay circuit 52, a decoding circuit 53, an attenuation circuit 54, and a combining circuit 55.

Figure 5A:
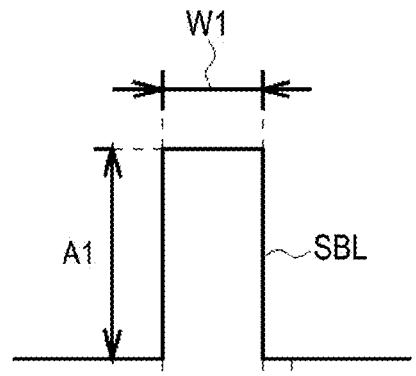
FIGS. 5A to 5E are schematic diagrams showing signals within the pulse signal generator.

The rectangular wave generation circuit 51 generates a rectangular wave SBL having a duration W1 and a voltage A1 as shown in FIG. 5A, and supplies the rectangular wave SBL to the delay circuit 52, the decoding circuit 53, and the combining circuit 55.

Figure 5B:
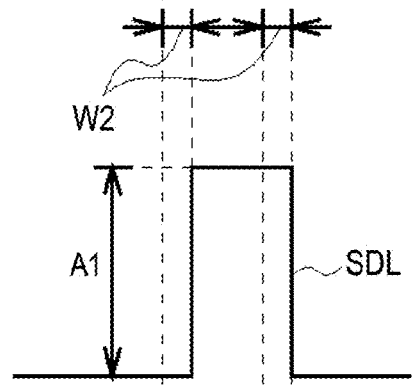

The delay circuit 52 generates a delayed rectangular wave SDL by delaying the rectangular wave SBL by a duration W2 as shown in FIG. 5B, and supplies it to the decoding circuit 53.

Figure 5C:
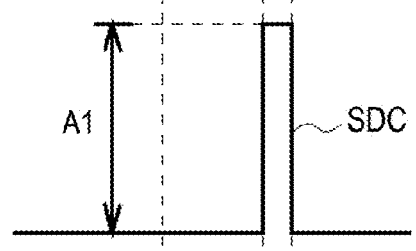

The decoding circuit 53 sets the output voltage to the voltage A1 when the voltage of the rectangular wave SBL is a reference voltage 0 [V] and the voltage of the delayed rectangular wave SDL is the voltage A1. Accordingly, as shown in FIG. 5C, the decoding circuit 53 supplies a decoded rectangular wave SDC at the voltage A1 from the falling of the rectangular wave SBL to the rising of the delayed rectangular wave SDL to the attenuation circuit 54.

Figure 5D:

The attenuation circuit 54 attenuates the voltage of the supplied decoded rectangular wave SDC at a predetermined rate to obtain an additional rectangular wave SAD having a voltage A2 as shown in FIG. 5D, and supplies it to the combining circuit 55.

Figure 5E:
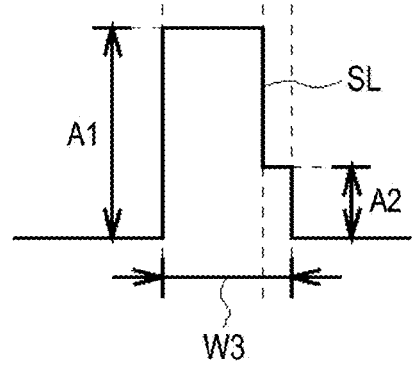

The combining circuit 55 generates a pulse signal SL as shown in FIG. 5E by combining to superimpose the rising of the additional rectangular wave SAD supplied from the attenuation circuit 54 on the falling of the rectangular wave SBL supplied from the rectangular wave generation circuit 51 and outputs it.

As described above, the pulse signal generator 41 outputs the pulse signal SL in which a part of the rectangular wave having the voltage A1 and a duration W3 drops to the voltage A2 by combining the rectangular wave SBL having the voltage A1 and the duration W1 and the additional rectangular wave SAD having the voltage A2 lower than the voltage A1 and the duration W2.

1-4. Pulse Signal and Laser Drive Signal

Here, as an experiment using the laser driving unit 31, the pulse signal SL only of the rectangular wave SBL (FIG. 5A) not the rectangular wave SBL combined with the additional rectangular wave SAD is amplified, and output it as the laser drive signal SD to the laser diode 32 (FIG. 2).

In this regard, the waveform of the pulse signal SL is as shown in FIG. 6A, and the waveform of the laser drive signal SD is as shown in FIG. 6B. Note that the pulse signal SL shown in FIG. 6A is a waveform that oscillates plus and minus around nearly 0 [V] because of the subsequent amplification by the amplifier 42.

In FIG. 6B, the peak voltage of the laser drive signal SD is about 15 [V]. Accordingly, the laser driving unit 31 can supply the laser drive signal SD having a high voltage to the laser diode 32.

However, in the laser drive signal SD, an undershoot of about 3 [V] occurs at falling. The undershoot is a larger value than 2 [V] as the above described absolute maximum rating of the reverse voltage of the laser diode 32.

Addition of the reverse voltage exceeding the absolute maximum rating of the laser diode 32 leads to breakage and characteristic deterioration of the laser diode 32.

As described above, when the amplifier 42 outputs the laser drive signal SD that falls from the high voltage (about 15 [V]) directly to 0 [V], there may be a possibility that the reverse voltage exceeding the absolute maximum rating may be applied to the laser diode 32.

On the other hand, the laser driving unit 31 according to the embodiment amplifies the pulse signal SL (FIG. 5E) formed by combining the additional rectangular wave SAD with the rectangular wave SBL, and outputs it as the laser drive signal SD to the laser diode 32 (FIG. 2).

Figure 7A:
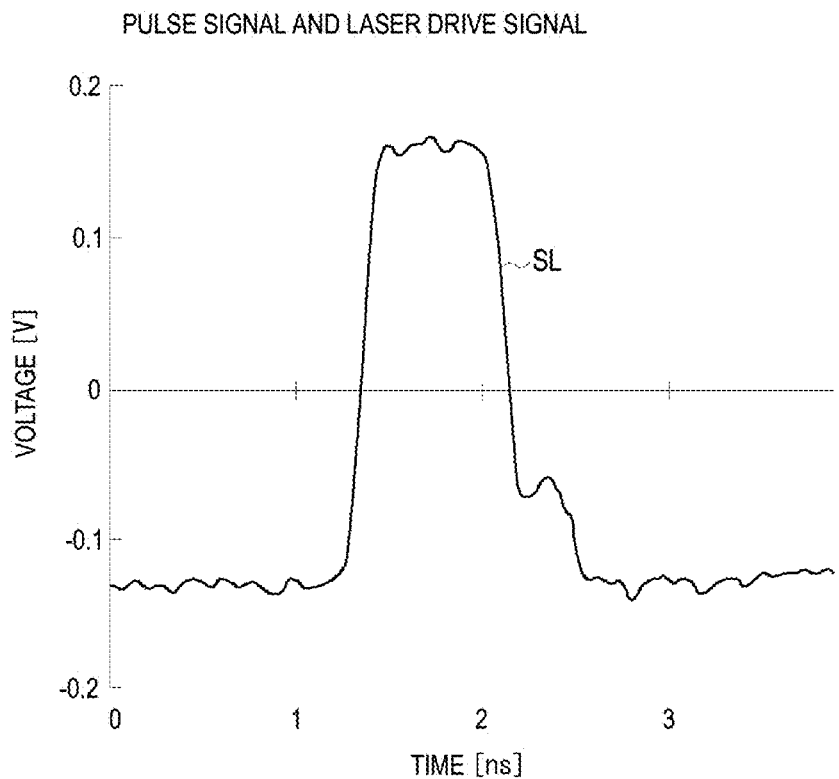
FIGS. 7A and 7B are schematic diagrams showing a pulse signal and a laser drive signal.
Figure 7B:
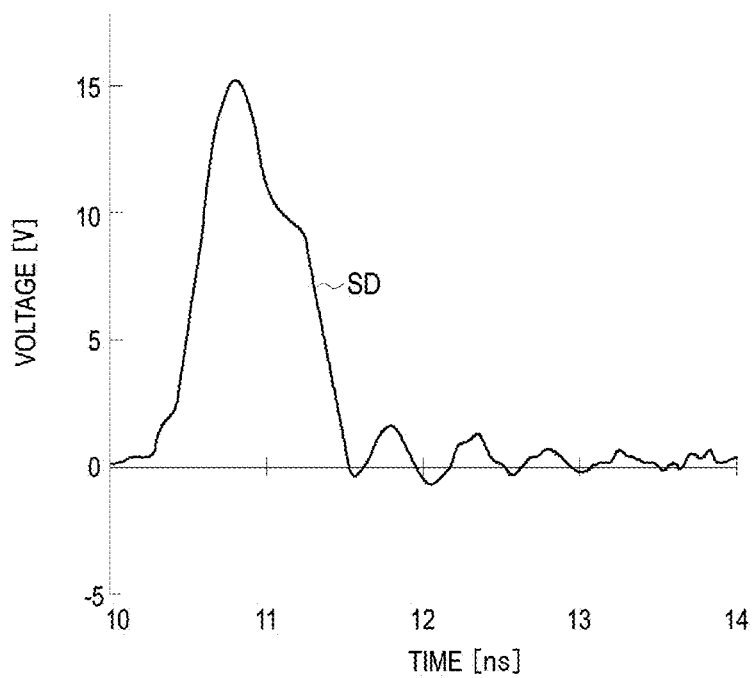

Here, the waveform of the pulse signal SL is as shown in FIG. 7A, and the waveform of the laser drive signal SD is as shown in FIG. 7B. Note that the pulse signal SL has the waveform distorted and blunted due to the frequency characteristic of the pulse signal generator.

The laser drive signal SD shown in FIG. 7B has the peak voltage as high as about 15 [V] as is the case of FIG. 6B.

On the other hand, the pulse signal SL shown in FIG. 7A is partially different in the part corresponding to the additional rectangular wave SAD (FIG. 5D) from FIG. 6A.

In the laser drive signal SD shown in FIG. 7B, there is few parts taking negative voltage values after falling and the undershoot is significantly reduced compared to FIG. 6B.

In practice, all of the undershoots occurring after falling in the laser drive signal SD shown in FIG. 7B fall within the absolute maximum rating of the reverse voltage of the laser diode 32.

Further, in the laser drive signal SD shown in FIG. 7B, the time of falling to 0 [V] is slightly later than in FIG. 6B.

1-5. Experiment of Difference in Undershoot Depending on Additional Rectangular Wave As described above, in the pulse signal SL according to the embodiment, the additional rectangular wave SAD is combined with the falling of the rectangular wave SBL.

Accordingly, in the laser drive signal SD of the amplified pulse signal SL, undershoots are reduced compared to the case where the pulse signal SL only of the rectangular wave SBL not combined with the additional rectangular wave SAD is amplified.

Here, the pulse signal SL only of the rectangular wave SBL not combined with the additional rectangular wave SAD may be regarded as the rectangular wave SBL combined with the additional rectangular wave SAD having the voltage 0 [V]. Accordingly, it is considered that, when the voltage of the additional rectangular wave SAD changes, the voltages of the undershoots appearing in the laser drive signal SD also change.

As below, using an experiment system 60 shown in FIG. 8, the voltage of the additional rectangular wave SAD is changed and the voltage of the additional rectangular wave SAD at which the voltage of the undershoot of the laser drive signal SD becomes the minimum is obtained.

In the experiment system 60, the pulse signal generator 41 of the laser driving unit 31 is set to generate the pulse signal SL of the rectangular wave SBL combined with the additional rectangular wave SAD at various voltages, and supplies the pulse signal SL based on the setting to the amplifier 42. Further, an oscilloscope 61 is connected to the pulse signal generator 41, and the pulse signal SL is measured by the oscilloscope 61.

The amplifier 42 of the laser driving unit 31 amplifies the pulse signal SL and outputs the laser drive signal SD to the anode side of the laser diode 32.

A current detection resistor 62 having a resistance value of 1 [Ω] is connected between the cathode side of the laser diode 32 and the reference potential GND.

An active differential probe 61P is connected between ends of the current detection resistor 62, and the potential difference between the ends of the current detection resistor 62 is measured by the oscilloscope 61.

In this regard, the current flowing in the current detection resistor 62, i.e., the current flowing in the laser diode 32 is determined depending on the relationship between the potential difference between the ends of the current detection resistor 62 and the resistance value of the current detection resistor 62. Hereinafter, the current flowing in the laser diode 32 is also referred to as "laser drive current CL".

Here, since there is a proportional relation between the laser drive current CL and the reverse voltage applied to the laser diode 32, it is considered that, when the current value of the undershoot of the laser drive current CL becomes the minimum, also the reverse voltage applied to the laser diode 32 is the minimum.

Figure 9:
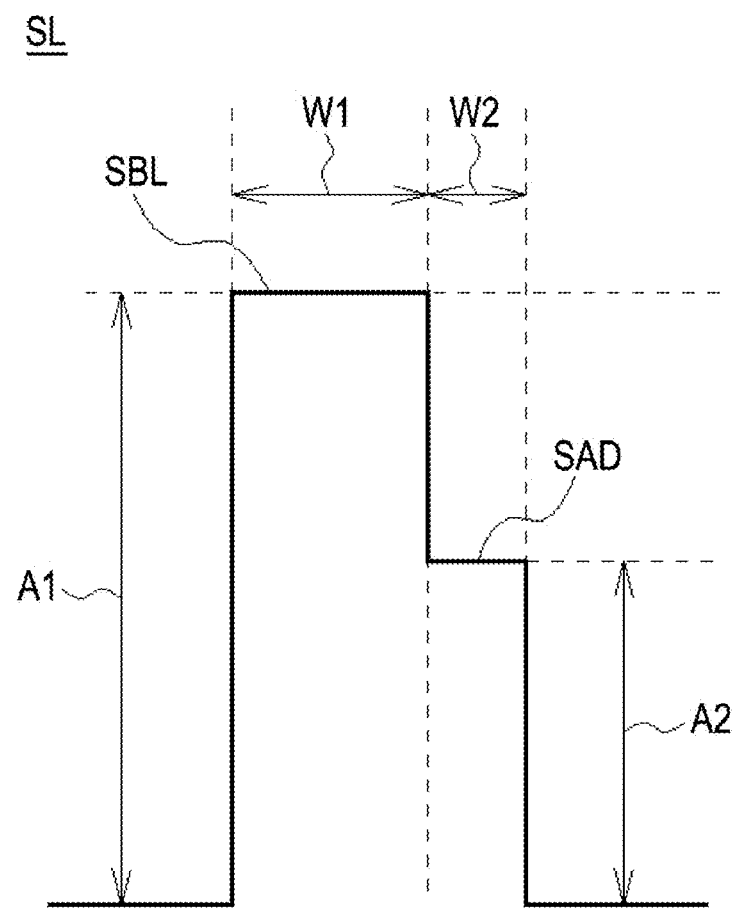
FIG. 9 is a schematic diagram for explanation of the voltage of additional rectangular wave in a pulse signal.

In the above described configuration, the pulse signal generator 41 generates the pulse signal SL shown in FIG. 9. Here, the pulse signal generator 41 outputs the pulse signal SL including the rectangular wave SBL having the duration W1 of 1.0 [ns] and the additional rectangular wave SAD having the duration W2 of 0.5 [ns].

By changing the ratio of the voltage A2 of the additional rectangular wave SAD to the voltage A1 of the rectangular wave SBL (hereinafter, this is referred to as "additional rectangular wave ratio RT) using the pulse signal generator 41, laser drive currents CL as shown in FIGS. 10A to 10E are obtained.

FIGS. 10A to 10E show current values when the additional rectangular wave ratio RT is set to 0, 25, 42, 64, and 100 [%], respectively.

Note that the oscilloscope 61 measures the potential difference between the ends of the current detection resistor 62, however, FIGS. 10A to 10E show the potential differences that have been obtained by the measurement converted into currents depending on the relationship between the current detection resistor 62 and itself.

Figure 10A:
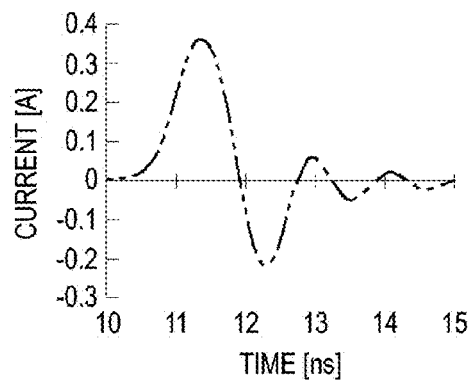
FIGS. 10A to 10E are schematic diagrams showing laser drive currents depending on the voltages of additional rectangular wave.
Figure 10B:
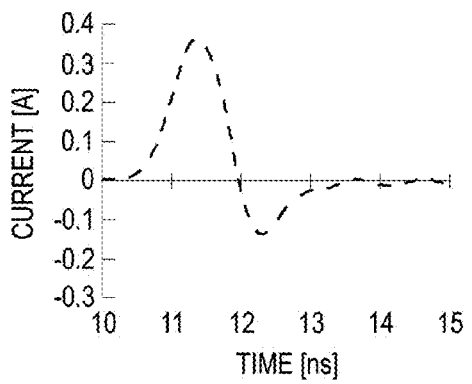

As shown in FIG. 10A, in the case where the additional rectangular wave ratio RT is 0 [%], that is, in the case of the pulse signal SL only of the rectangular wave SBL, an undershoot of a large current value appears in the laser drive current CL at the time of 12 [ns].

Further, as shown in FIGS. 10B to 10E, as the additional rectangular wave ratio RT is larger, the undershoot of the laser drive current CL at the time of 12 [ns] becomes smaller. The laser drive current CL shown in FIG. 10E has not dropped to the negative value at the time of 12 [ns].

Figure 10C:
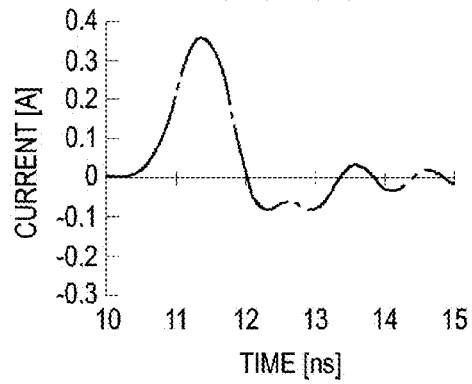
Figure 10D:
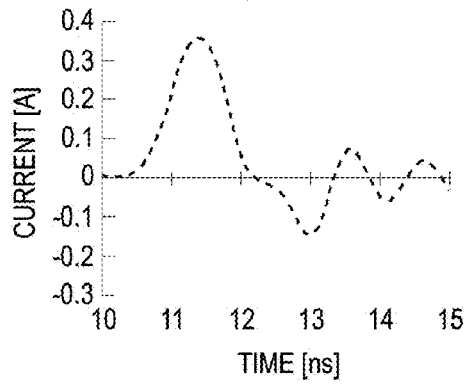
Figure 10E:
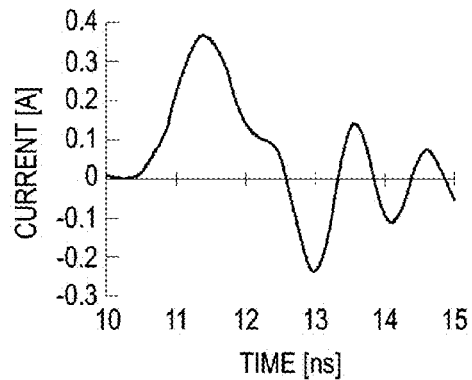

On the other hand, as shown in FIG. 10E, in the case where the additional rectangular wave ratio RT is 100 [%], that is, in the case where the pulse signal SL is a rectangular wave having a duration of 1.5 [ns], an undershoot of a large current value appears in the laser drive current CL at the time of 13 [ns].

Further, as shown in FIGS. 10A to 10D, as the additional rectangular wave ratio RT is smaller, the undershoot of the laser drive current CL at the time of 13 [ns] becomes smaller. The laser drive current CL shown in FIG. 10A has not dropped to the negative value at the time of 13 [ns].

Here, as shown in FIG. 10C, when the additional rectangular wave ratio RT is 42 [%], the current value of the undershoot of the laser drive current CL becomes the minimum.

Thereby, it is considered that, regarding the laser drive signal SD having a proportional relation to the laser drive current CL, the voltage value of the undershoot becomes the minimum when the additional rectangular wave ratio RT is 42 [%].

Figure 11:
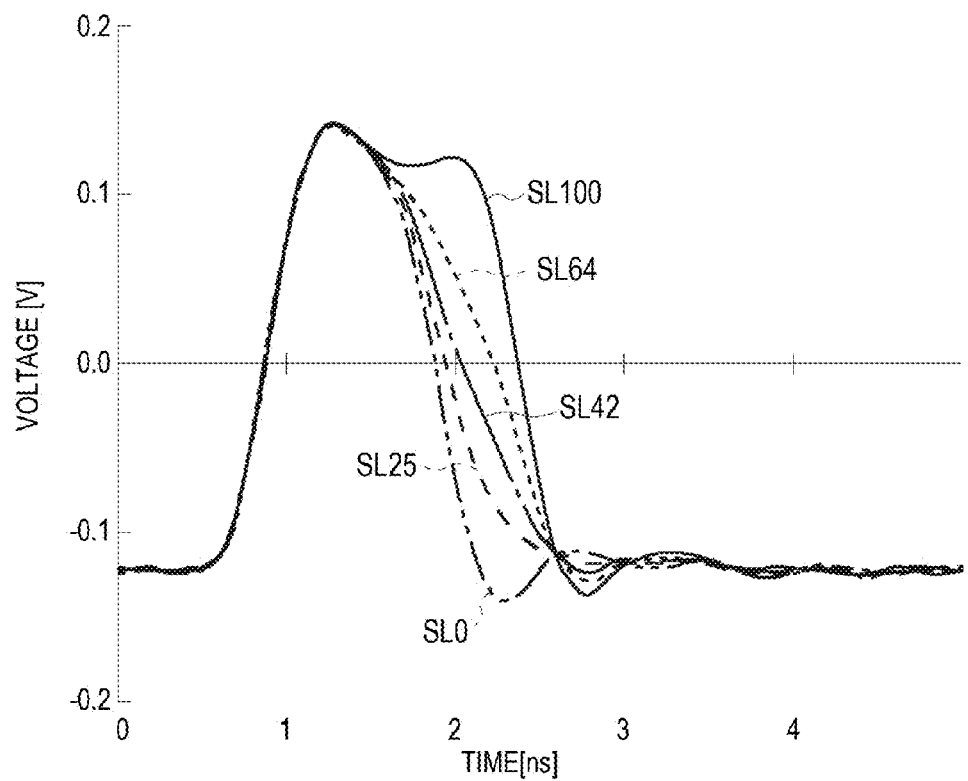
FIG. 11 is a schematic diagram showing pulse signals SL depending on the voltages of additional rectangular wave.

Next, pulse signals SL when the additional rectangular wave ratio RT is changed are shown in FIG. 11. FIG. 11 shows pulse signals SL when the additional rectangular wave ratio RT is set to 0, 25, 42, 64, and 100 [%] as pulse signals SL0, SL25, SL42, SL64, and SL100, respectively.

Note that the pulse signal SL at a high frequency output from the pulse signal generator 41 passes a circuit length to some degree while it is amplified by the amplifier 42 to be a laser drive signal SD and supplied to the laser diode 32, and the signal is delayed.

Accordingly, the pulse signals SL start to rise at the time of 0 to 1 [ns], and the laser drive currents CL shown in FIGS. 10A to 10E start to rise later by about 10 [ns] from the time.

As shown in FIG. 11, the pulse signal SL0 at the additional rectangular wave ratio RT of 0 [%] starts to fall at the earliest time of the signal pulses at the other additional rectangular wave ratios RT. Further, the larger the additional rectangular wave ratio RT, the later the pulse signal SL starts to fall.

Thus, when the additional rectangular wave ratio RT is 42 [%], the laser drive signal SD with the minimum undershoot voltage value is obtained.

1-6. Operation and Advantages

In the above described configuration, the pulse signal generator 41 of the laser driving unit 31 performs combining so that the rising of the additional rectangular wave SAD having a smaller voltage than that of the rectangular wave SBL may coincide with the falling of the rectangular wave SBL, and supplies it as the pulse signal SL to the amplifier 42.

In response, the amplifier 42 amplifies the pulse signal SL and outputs it as the laser drive signal SD to the laser diode 32.

Accordingly, the laser driving unit 31 can supply the laser drive signal SD having the falling voltage becoming smaller in stages to the laser diode 32.

If the laser driving unit 31 amplifies the pulse signal SL only of the rectangular wave SBL not combined with the additional rectangular wave SAD, the unit outputs the laser drive signal SD that rapidly falls from the high voltage to 0 [V] to the laser diode 32.

In this case, a large undershoot occurs in the falling of the laser drive signal SD (FIG. 6B). Accordingly, a reverse voltage exceeding the absolute maximum rating is applied to the laser diode 32, breakage and characteristic deterioration may be caused.

On the other hand, the laser driving unit 31 according to the embodiment of the invention can supply the laser drive signal SD with reduced undershoot at the falling (FIG. 7B) to the laser diode 32.

Thereby, the laser driving unit 31 can prevent the reverse voltage exceeding the absolute maximum rating from being applied to the laser diode 32.

Further, to suppress the undershoot of the laser drive signal SD, a method of adjusting the pulse signal SL in an analog fashion so that the pulse signal SL may gently fall is conceivable.

On the other hand, in the laser driving unit 31 according to the embodiment of the invention, it is only necessary to combine rectangular waves, and the undershoot of the laser drive signal SD can be suppressed using simple signal processing and circuit configuration.

Further, a method of suppressing the undershoot by adding an electronic component such as a capacitor to slow the falling of the laser drive signal SD is also conceivable. However, in this case, not only the falling of the laser drive signal SD but also the rising may be gentle.

Since the optical disc device 1 uses two-photon absorption reaction, it is necessary to supply a pulsed laser drive signal SD having a high voltage to the laser diode 32. Accordingly, the laser drive signal SD that gently rises is not suitable for the optical disc device 1 in the embodiment of the invention.

The laser driving unit 31 in the embodiment of the invention can reduce the undershoot in the falling of the laser drive signal SD and maintain the steep rising.

Thereby, in the optical disc device 1, the laser drive signal SD steeply rising and having a high voltage can be applied to the laser diode 32, and thus, light emission times of the laser diode 32 are not delayed though the subsequent falling becomes gentle. Therefore, the optical disc device 1 can appropriately perform recording on the optical disc 100.

According to the above described configuration, the pulse signal generator 41 of the laser driving unit 31 performs combining so that the rising of the additional rectangular wave SAD having a smaller voltage than that of the rectangular wave SBL may coincide with the falling of the rectangular wave SBL, and supplies it as the pulse signal SL to the amplifier 42. In response, the amplifier 42 amplifies the pulse signal SL and outputs it as the laser drive signal SD to the laser diode 32. Thereby, the laser driving unit 31 can supply the laser drive signal SD to the laser diode 32 with the reduced undershoot that may occur at amplification by the amplifier 42 by making the falling voltage of the laser drive signal SD smaller in stages.

2. Other Embodiments

In the above described embodiment, the case where the laser driving unit 31 combines one additional rectangular wave SAD having a smaller voltage than that of the rectangular wave SBL with the rectangular wave SBL and generates the pulse signal SL has been described.

Figure 12:
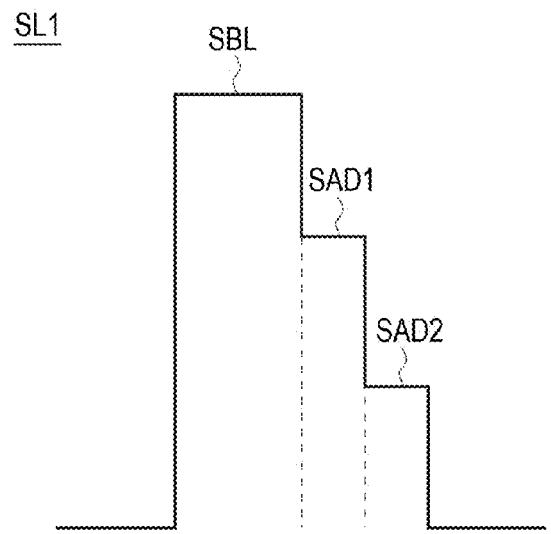
FIG. 12 is a schematic diagram showing a pulse signal (1) according to another embodiment.

However, the embodiment of the invention is not limited to that, but, for example, as shown in FIG. 12, a pulse signal SL1 may be generated by combining an additional rectangular wave SAD1 having a smaller voltage than that of the rectangular wave SBL and an additional rectangular wave SAD2 having a smaller voltage than that of the additional rectangular wave SAD1 with the rectangular wave SBL.

That is, plural additional rectangular waves SAD having smaller voltages than that of the rectangular wave SBL may be combined with the rectangular wave SBL. In this case, by making the voltages of the plural additional rectangular waves SAD to be combined with the rectangular wave SBL gradually smaller in stages, the undershoot of the laser drive signal SD can be further reduced.

Note that, if the number of the additional rectangular waves SAD is too many, the time elapsed before the laser drive signal SD has fallen is too long, and thus, it is necessary to adjust, in the laser drive signal SD shown in FIG. 3B, the falling of a predetermined pulse not to overlap with the rising of the next output pulse of the laser drive signal SD.

Further, in the above described embodiment, the case where the duration W2 of the additional rectangular wave SAD is set to 0.5 [ns] has been described.

Figure 13:
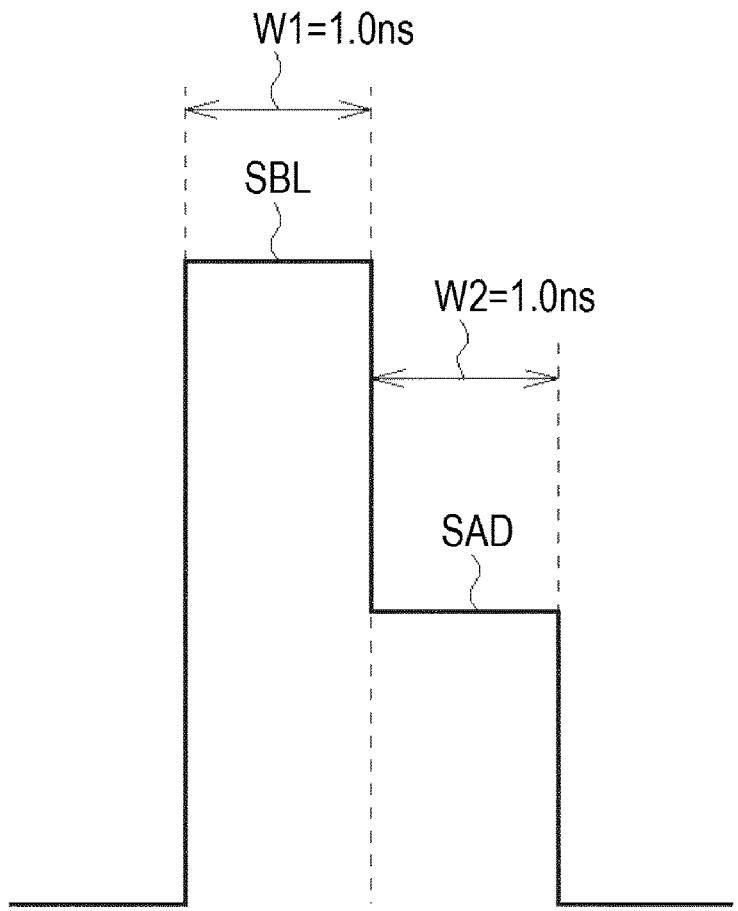
FIG. 13 is a schematic diagram showing a pulse signal (2) according to another embodiment.

However, the embodiment of the invention is not limited to that, but, for example, the duration W2 of the additional rectangular wave SAD may be set to 1.0 [ns] like the pulse signal SL2 shown in FIG. 13.

That is, an appropriate duration W2 of the additional rectangular wave SAD may be set in consideration of the amplification characteristic of the amplifier 42 and the inductance component and the capacitance component within the laser diode 32 having product difference and individual difference in characteristics.

Further, it is desirable that also the voltage A2 of the additional rectangular wave SAD may be optimized in consideration of the amplification characteristic of the amplifier 42 and the inductance component and the capacitance component within the laser diode 32.

Furthermore, in the above described embodiment, the case where the pulse signal generator 41 includes the rectangular wave generation circuit 51, the delay circuit 52, the decoding circuit 53, the attenuation circuit 54, and the combining circuit 55 and outputs the pulse signal SL has been described.

However, the embodiment of the invention is not limited to that, but, for example, the rectangular wave SBL and the decoded rectangular wave SDC may be generated by an FPGA (Field Programmable Gate Array), the decoded rectangular wave SDC may be attenuated and combined with the rectangular wave SBL, and the pulse signal SL may be output.

That is, it is only necessary for the pulse signal generator 41 to be able to output the pulse signal SL formed by combining one ore more additional rectangular waves SAD having a smaller voltage than that of the rectangular wave SBL with the rectangular wave SBL.

Further, in the above described embodiment, the case where the pulse signal SL output by the pulse signal generator 41 is amplified by the amplifier 42 and then supplied as the laser drive signal SD to the laser diode 32 has been described.

However, the embodiment of the invention is not limited to that, but the pulse signal SL output by the pulse signal generator 41 may be subjected to predetermined electric processing by an equalizer, for example, and supplied to the laser diode 32.

Furthermore, in the above described embodiment, the case where the additional rectangular wave ratio RT at which the undershoot of the laser drive signal SD becomes the minimum is obtained has been described.

However, the embodiment of the invention is not limited to that, but the undershoot may occur in the laser drive signal SD and the reverse voltage may be applied to the laser diode 32 at most to some degree. That is, it is only necessary to set the additional rectangular wave ratio RT in the pulse signal generator 41 so that the undershoot of the laser drive signal SD may fall within a range of the reverse voltage that does not exceed the absolute maximum rating of the laser diode 32.

Further, in the above described embodiment, the case where the pulse signal generator 41 combines the additional rectangular wave SAD with the rectangular wave SBL so that the rising of the additional rectangular wave SAD may coincides with the falling of the rectangular wave SBL has been described.

As described above, the pulse signal SL has the waveform distorted and blunted due to the frequency characteristic of the pulse signal generator 41. Accordingly, even when there is only a slight gap between the falling of the rectangular wave SBL and the rising of the additional rectangular wave SAD, the pulse signal SL output from the pulse signal generator 41 has a waveform in which the falling of the rectangular wave SBL and the rising of the additional rectangular wave SAD are gently connected.

Accordingly, in the embodiments of the invention, there may be a gap between the falling of the rectangular wave SBL and the rising of the additional rectangular wave SAD to some degree.

Furthermore, in the above described embodiment, the case where the pulse signal generator 41 as a pulse signal generating unit and the amplifier 42 as an output unit form the laser driving unit 31 as a laser driving device has been described.

However, the embodiment of the invention is not limited to that, but a pulse signal generating unit and an output unit including other various circuit configurations may form a laser driving device.

The embodiments of the invention may also be used in an optical disc device that records information of images, sounds, various data, or the like in optical discs and reproduces the information from the optical discs.

The present application contains subject matter related to that disclosed in Japanese Priority Patent Application JP 2009-138491 filed in the Japan Patent Office on Jun. 9, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A laser driving device comprising:
 a pulse signal generating unit to, after a voltage has risen from a reference voltage to an output voltage and a time of a sum of an oscillation period of relaxation oscillation and a light emission start time in a laser diode has nearly elapsed, generate a pulse signal having a waveform that falls divisionally in two or more stages from the output voltage to the reference voltage;
 an output unit to generate a laser drive signal by performing signal processing on the pulse signal and to output the signal to the laser diode; and
 wherein the pulse signal generating unit has a basic waveform generation circuit, an additional waveform generation circuit, and a waveform combining circuit,
 the basic waveform generation circuit generates a basic waveform of rectangular wave that rises to the output voltage and then falls to the reference voltage,
 the additional waveform generation circuit generates an additional waveform of an arbitrary number of rectangular waves having voltages that are smaller than the output voltage of the basic waveform and sequentially fall from the basic waveform, and
 the waveform combining circuit generates the pulse signal by combining a rising of the additional waveform with a falling of the basic waveform.

2. The laser driving device according to claim 1, wherein the additional waveform generation circuit generates the additional waveform having one rectangular wave having a voltage that is smaller than the output voltage of the basic waveform.

3. The laser driving device according to claim 1, wherein the output unit includes an amplifier to amplify the pulse signal at a predetermined amplification factor and to output the signal.

4. A laser driving method comprising the steps of:
 a pulse signal generation step of, after a voltage has risen from a reference voltage to a predetermined output voltage and a time of a sum of an oscillation period of relaxation oscillation and a light emission start time in a laser diode has nearly elapsed, generating a pulse signal having a waveform that falls divisionally in two or more stages from the output voltage to the reference voltage;
 an output step of generating a laser drive signal by performing signal processing on the pulse signal and outputting the signal to the laser diode, wherein the pulse signal generation step further includes:
 a basic waveform generation step of generating a basic waveform of rectangular wave that rises to the output voltage and then falls to the reference voltage;
 an additional waveform generation step of generating an additional waveform of an arbitrary number of rectangular waves having voltages that are smaller than the output voltage of the basic waveform and sequentially fall from the basic waveform; and
 a waveform combining step of generating the pulse signal by combining a rising of the additional waveform with a falling of the basic waveform.

* * * * *